United States Patent [19]
Wilson

[11] 3,719,779
[45] March 6, 1973

[54] HIGH SPEED FREQUENCY SHIFT KEYED TRANSMISSION SYSTEM

[75] Inventor: Kenneth A. Wilson, Bridgeport, Conn.

[73] Assignee: American Chain & Cable Company, Inc., New York, N.Y.

[22] Filed: May 22, 1970

[21] Appl. No.: 39,712

[52] U.S. Cl. .....................178/66 R, 325/30, 325/320
[51] Int. Cl. .......H04l 27/10, H04l 27/12, H04l 27/14
[58] Field of Search ......178/66, 88; 325/30, 45, 145, 325/163, 320, 349; 328/27, 140; 329/110, 122; 331/141, 179, 138, 140; 332/16, 29

[56] References Cited

UNITED STATES PATENTS

| | | | |
|---|---|---|---|
| 3,178,515 | 4/1965 | Bramer | 178/66 X |
| 3,257,508 | 6/1966 | Crafts et al. | 325/30 X |
| 3,418,578 | 12/1968 | Bose | 325/45 |
| 3,510,803 | 5/1970 | Jacobson et al. | 332/14 |
| 3,114,117 | 10/1963 | Anderson | 331/140 X |
| 3,500,246 | 3/1970 | Werner | 331/140 |
| 3,581,220 | 5/1971 | Bell | 325/320 X |
| 3,597,704 | 8/1971 | Steinger | 331/140 |

*Primary Examiner*—Benedict V. Safourek
*Attorney*—Pennie, Edmonds, Morton, Taylor and Adams

[57] ABSTRACT

A frequency shift keyed data transmission system utilizes a transmitter comprising an oscillator for producing a series of output voltage pulses whose repetition rate is governed by the time constant of an associated RC circuit, a key switch for altering the resistance of the associated circuit—thereby altering the pulse repetition rate—and a conversion circuit for converting the pulses into sinusoidal output waves having a frequency proportional to the pulse repetition rate. This transmitter is capable of transmitting data at high bit rates without introducing significant frequency transients. A receiver which utilizes a discriminator comprising circuitry similar to that of the above-described transmitter can be used to detect FSK information in a manner which is substantially independent of variations in the signal amplitude.

5 Claims, 6 Drawing Figures

INVENTOR
Kenneth A. Wilson
BY Pennie, Edmonds, Morton, Taylor & Adams
ATTORNEYS

INVENTOR
Kenneth A. Wilson
BY Pennie, Edmonds, Morton, Taylor & Adams
ATTORNEYS

INVENTOR
Kenneth A. Wilson
BY Pennie, Edmonds, Morton, Taylor + Adams
ATTORNEYS

HIGH SPEED FREQUENCY SHIFT KEYED TRANSMISSION SYSTEM

BACKGROUND OF THE INVENTION

The present invention relates to a frequency shift keyed (FSK) communications system capable of transmitting information at high bit rates without introducing significant frequency transients and capable of receiving frequency shift keyed information in a manner which is substantially independent of variations in the amplitude of the transmitted signal.

The rapidly increasing use of automatic data processing has led to an accelerated demand for better and faster data transmissions systems. Efficient use of data processing equipment very often requires the transmission of data from an input-output terminal to a central data processor or direct computer-to-computer transmission. As a consequence of the inherent limitations in the presently existing transmission media such as, for example, the telephone network, increasingly efficient transmitting and receiving equipment is needed for meeting the expanding demand for data transmission.

Frequency shift keyed systems are particularly promising for use in the transmission of machine readable data. Such systems comprise a transmitter capable of modulating the frequency of a carrier signal among predetermined discrete values, a transmission medium, and a receiver capable of demodulating the FSK modulated carrier. Typical prior art systems, however, are not well-suited for the rapid transmission of data required for efficient use of data processing equipment.

One problem limiting the speed of FSK systems is the introduction of frequency transients in the modulation of the carrier signal. In typical prior art FSK transmitters, the frequency of the carrier is generally varied by switching among different values of capacity or inductance in an oscillator. This switching changes the resonance frequency of the oscillator and, therefore, the frequency of an output signal. However, because the energy in an inductor or capacitor does not change immediately, frequency transients are introduced in the period immediately following the switching operation. The presence of these transients lengthens the period of time at which the new frequency must be maintained in order for the receiver to detect the modulation with acceptable distortion. In general, the new frequency must be maintained for a period of time at least 10 times that in which the frequency transients are present. This requirement becomes an unacceptable limitation in high speed FSK systems.

A second problem which limits the use of FSK systems in high speed data transmission is spurious signals introduced by variations in the amplitude of the transmitted carrier signal. While FSK receivers should detect only variations in frequency, it has nonetheless been found that typical prior art receivers using tuned circuits for frequency detection produce an output which is a function of both the carrier frequency and the carrier amplitude. This amplitude dependence permits the introduction of spurious signals due, for example, to amplitude variations introduced in the transmission medium.

SUMMARY OF THE INVENTION

In accordance with the present invention, an FSK data transmission system utilizes a transmitter which is substantially free of frequency transients comprising an oscillator for producing a series of output voltage pulses whose repetition is governed by the time constant of an associated RC circuit, a key switch for altering the resistance of the associated circuit—thereby altering the pulse repetition rate—and a conversion circuit for converting the pulses into sinusoidal output waves having a frequency proportional to the pulse repetition rate. A receiver which utilizes a discriminator comprising circuitry similar to that of the above-described transmitter can be used to detect FSK information in a manner which is substantially independent of variations in the signal amplitude.

BRIEF DESCRIPTION OF THE DRAWINGS

The nature, features, and advantages of the present invention will appear more fully upon consideration of the illustrative embodiments of the invention now to be described in detail in connection with the accompanying drawings. In the drawings:

FIGS. 6A, 6B, 6C, and 6D are graphical illustrations showing voltage waveforms at various points in the receiver of FIG. 4.

DETAILED DESCRIPTION

Figure 1:
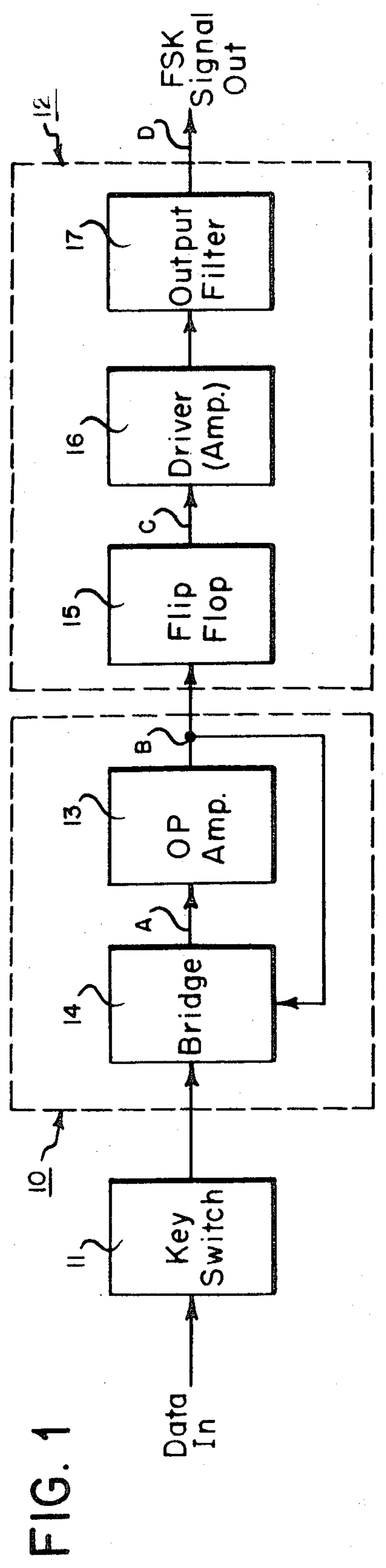
FIG. 1 is a partially schematic circuit diagram of one embodiment of a transmitter in accordance with the invention.

In reference to the drawings, FIG. 1 shows a transmitter comprising, in essence, an oscillator 10 for producing a series of output voltage pulses whose repetition rate is governed by the time constant of an associated RC circuit, a key switch 11 for altering the resistance of the associated circuit, thereby altering the pulse repetition rate; and a conversion circuit 12 for converting the pulses into sinusoidal output waves having a frequency proportional to the pulse repetition rate.

In a preferred embodiment, the oscillator comprises an operational amplifier 13 with its input coupled to the output of a bridge circuit 14 which includes a capacitive arm. When the voltage across the capacitor builds up to a sufficiently high value, the bridge output causes the amplifier to produce an output signal and the resulting output signal, in turn, operates a switching arrangement for permitting the capacitor to discharge. The net result is the production of a voltage pulse. A specific example of such an oscillator will be described in greater detail below.

The conversion circuitry preferably comprises a flip-flop 15 for producing from the voltage pulses a train of rectangular waves having a frequency equal to one-half the pulse repetition rate, an amplifier 16 for augmenting the rectangular waves and a filter 17 for selectively passing only the fundamental sinusoidal component of the rectangular wave.

Figure 2:
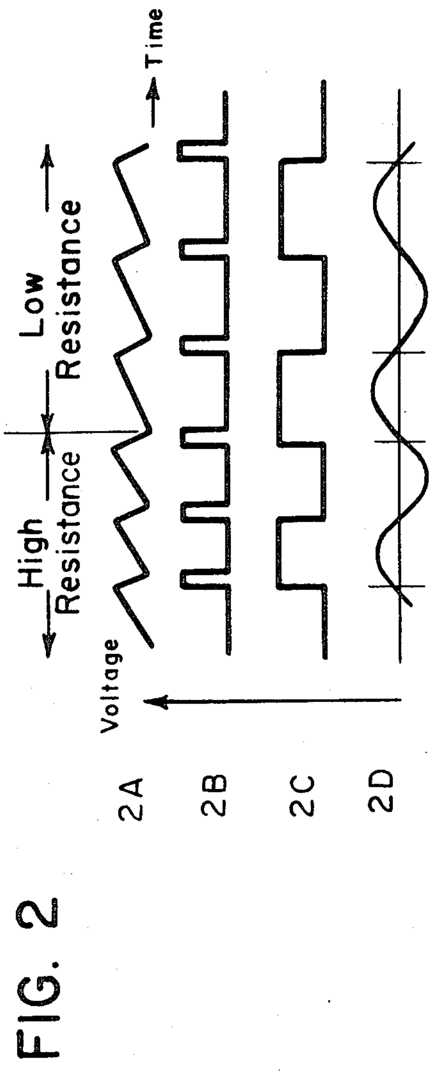
FIGS. 2A, 2B, 2C, and 2D are graphical illustrations showing voltage waveforms at various points in the transmitter of FIG. 1.

The operation of the transmitter can be more clearly understood by reference to FIGS. 2A, 2B, 2C, and 2D which show, respectively, the voltage waveforms at point A, the amplifier input; point B, the amplifier output; point C, the flip-flop output; and point D, the filter output. The waveforms are shown for two different values of resistance in the associated RC circuit. As can be seen from the drawing, the voltage applied to the amplifier input comprises a series of sawtooth waves, the forward slope of which is dependent on the time constant of the associated RC circuit. Specifically, when the amplifier input is coupled to a capacitor which, in turn, is serially connected to a voltage source through a resistor, the forward slope of the sawtooth waves is, to the first order of approximation, proportional to the product of the capacitance and the series resistance. Thus, when the series resistance is altered, the forward slope is altered. As can be seen from FIG. 2B, this alteration in forward slope alters the rate at which pulses are triggered from the amplifier. Since each pulse produces a change in state at the flip-flop, the output of the flip-flop (shown in FIG. 2C) is a rectangular wave having a frequency equal to one-half the pulse repetition rate, and the frequency of the rectangular wave is also altered by a change in the series resistance. As is shown in FIG. 2D, the output of the filter is a sinusoidal wave having substantially the same frequency as the rectangular wave.

Figures 3, 4:
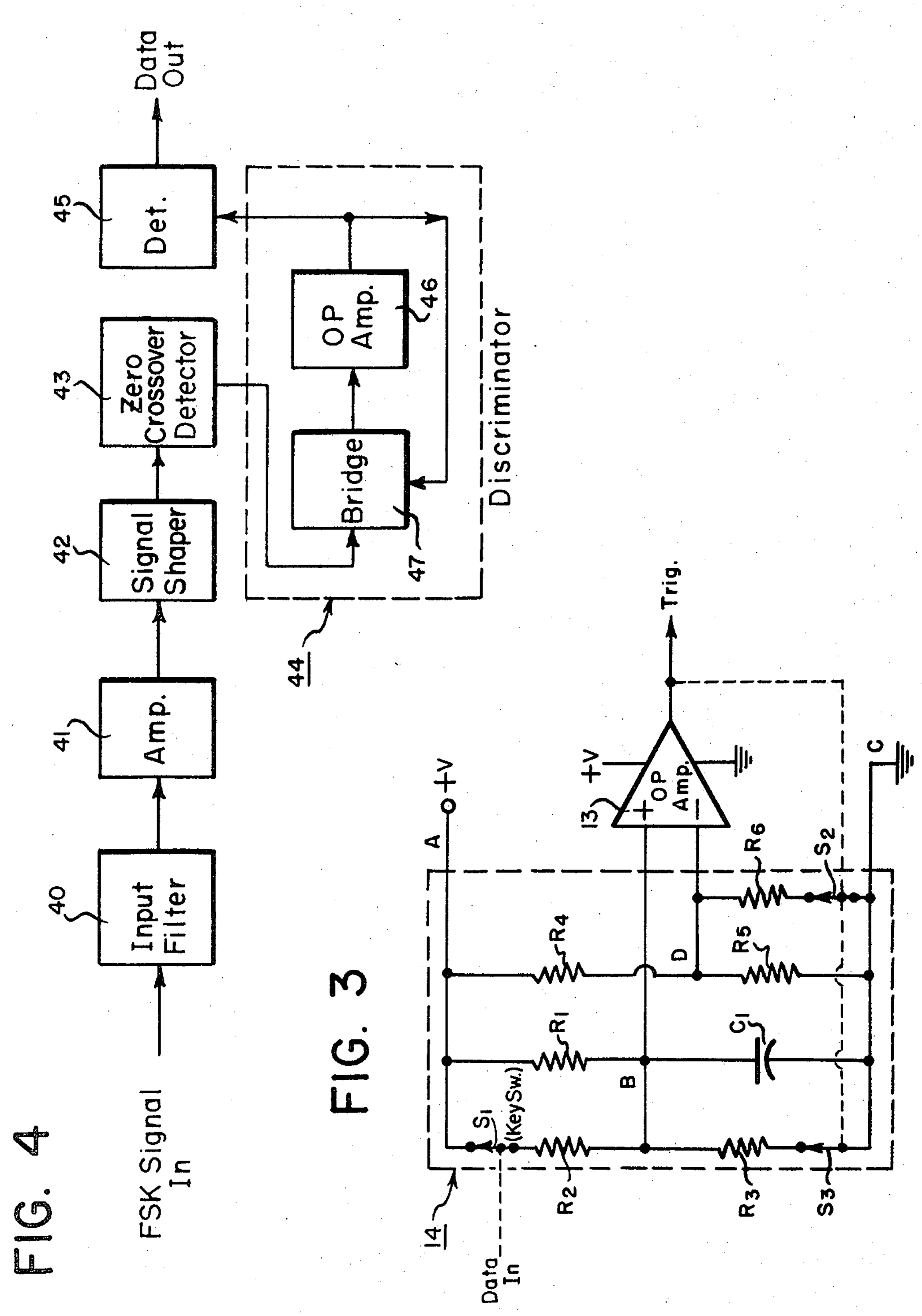
FIG. 3 is a more detailed circuit diagram of an oscillator and key switch arrangement useful in the transmitter of FIG. 1.
FIG. 4 is a schematic circuit diagram of a receiver in accordance with the invention.

FIG. 3 is a partially schematic circuit diagram of one example of an oscillator and key switch arrangement useful in the embodiment of FIG. 1. The arrangement comprises, in essence, a bridge circuit 14, including a capacitive arm, coupled to an operational amplifier 13. The bridge is comprised of four arms, the first of which consists of parallel resistors $R_1$ and $R_2$, the second arm consists of capacitor $C_1$ in parallel with $R_3$, the third of $R_5$ in parallel with $R_6$ and the fourth, of $R_4$. A voltage source V is applied between voltage supply nodes A and C of the bridge, and the amplifier input terminals are applied between output nodes B and D.

The bridge includes switching arrangements for changing its time constant and its equilibrium state. Specifically, key switch $S_1$ is provided in series with resistor $R_2$ for permitting alteration of the time constant by changing the resistance in series between the capacitor and the voltage source, and normally open switches $S_2$ and $S_3$ are provided for both changing the equilibrium state and permitting the discharge of capacitor $C_1$ upon the triggering of an amplifier pulse. For example, when $S_1$ is closed, a voltage builds up across the capacitor at a rate proportional to $(R_1R_2)/(R_1 + R_2)\ C_1$ until the potential at node B exceeds the potential at node D and the amplifier is thereby enabled to produce an output signal. This output signal, in turn, closes switches $S_2$ and $S_3$. Switch $S_2$ reduces the reverse bias on the amplifier by introducing resistor $R_6$ in parallel with resistor $R_5$, and switch $S_3$ permits capacitor $C_1$ to partially discharge to this lower bias voltage by providing a path through resistor $R_3$. When the capacitor voltage drops down to the bias voltage, the output signal ends, switches $S_2$ and $S_3$ open, and voltage again builds up on the capacitor. The device operates in substantially the same manner when key switch $S_1$ is open, except that the rate of voltage built up is then proportional to $R_1C_1$ because $R_2$ has been taken from the current path. Switch $S_1$, like switches $S_2$ and $S_3$, can be well-known voltage-controlled switches such as insulated gate field effect transistors.

After it leaves the transmitter, an FSK modulated signal generally passes through a transmission medium, such as the telephone network, to a distant receiver. The receiver is generally designed to convert the discrete frequency modulated signals into more easily interpreted amplitude modulated signals. While most prior art FSK receivers are useful in conjunction with the above-described transmitter, a receiver which has been found to be particularly advantageous over those used in the prior art is described below.

FIG. 4 is a schematic circuit diagram of a receiver in accordance with the invention comprising, in essence, and input filter 40 for selectively passing the discrete signal frequencies, an amplifier 41 for increasing the amplitude of the transmitted signals, a signal shaper 42 for converting the sinusoidal waves into rectangular waves. The rectangular waves, in turn, are applied to a zero crossover detector 43 for producing a voltage pulse— referred to as a reset pulse—each time the voltage passes from negative to positive polarity. The reset pulses are then applied to a discriminator 44 for producing output pulses whose width is indicative of the time between successive reset pulses. These output pulses, in turn, are applied to a detector 45 for converting the pulse width variations into pulse amplitude variations.

All of the receiver components, other than the discriminator, are well known in the art. The discriminator is, in essence, an oscillator comprising an operational amplifier 46 coupled to an associated RC circuit 47. More specifically, the discriminator comprises an oscillator which would normally trigger output pulses at the repetition rate corresponding to the frequency of the highest frequency FSK signal. However, the oscillator is also provided with a switching arrangement responsive to the reset pulses which precludes termination of an output pulse until a reset pulse arrives. Thus, during the high frequency signal, the discriminator emits pulses at its normal repetition rate, and during the low frequency signal, the termination of the discriminator pulses is delayed until the zero cross over detector emits a reset pulse.

Figures 5, 6:
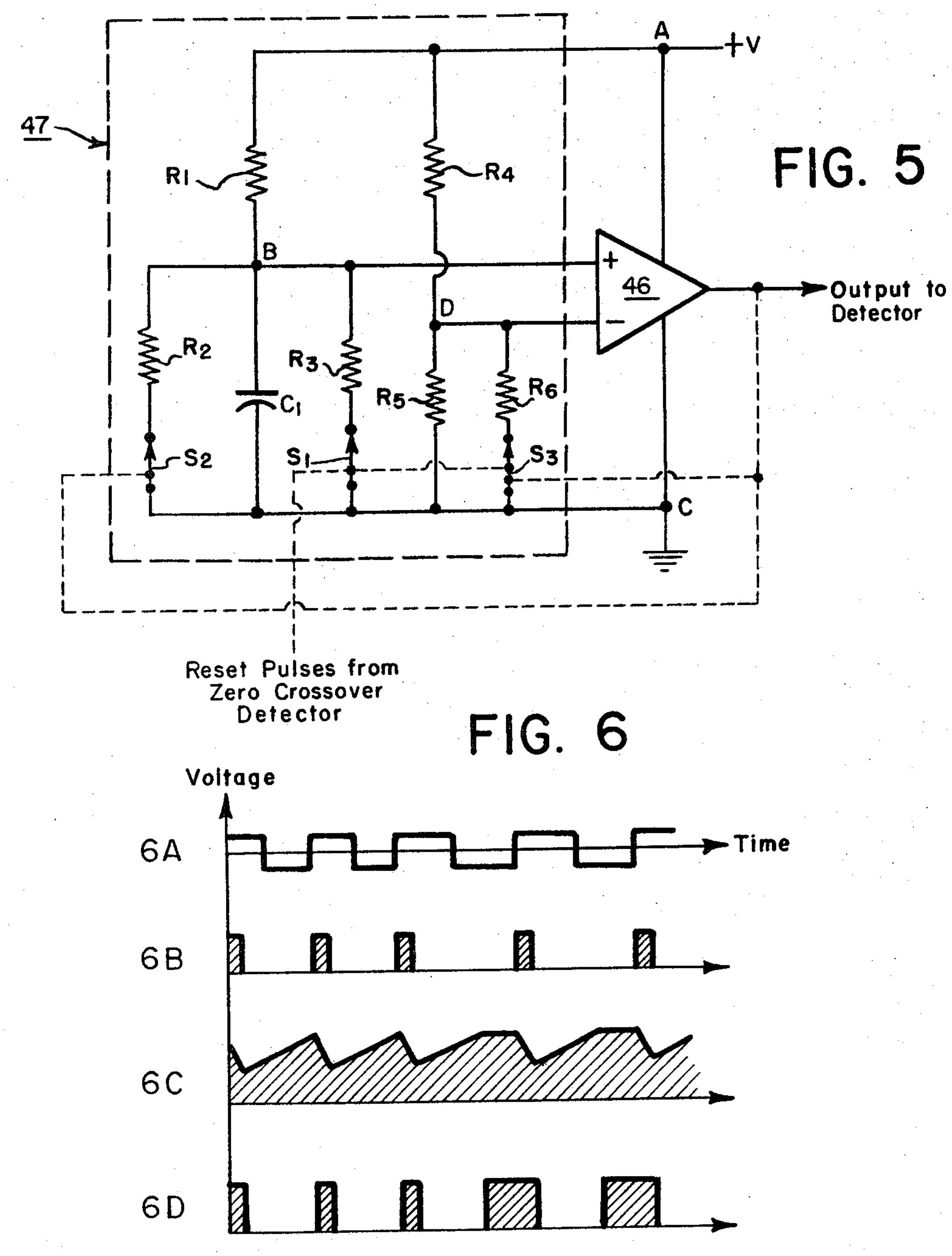
FIG. 5 is a more detailed circuit diagram of a discriminator for use in the receiver of FIG. 4.

FIG. 5 shows in greater detail one example of a discriminator useful in accordance with the invention, comprising an operational amplifier 46 coupled to an associated bridge circuit 47 to form an oscillator somewhat similar to that shown in FIG. 3. The bridge is comprised of four arms, the first of which consist of resistor $R_1$, the second arm consists of capacitor $C_1$ in parallel with resistors $R_2$ and $R_3$, the third arm of $R_5$ and $R_6$ in parallel and the fourth of $R_4$. A voltage source V is applied between nodes A and C, and the amplifier input terminals are connected between nodes B and D.

A switching arrangement comprising normally open switches 1, 1, $S_2$, and $S_3$ is provided for permitting pulse operation of the oscillator but preventing the termination of an output pulse until a reset pulse is received. In particular, switch $S_1$ is provided for connecting $R_3$ in parallel with capacitor $C_1$ in response to a reset pulse, switch $S_2$ for connecting $R_2$ in response to an amplifier output pulse, and switch $S_3$ for connecting resistor $R_6$ in parallel with resistor $R_5$ in response to either a reset pulse or an output pulse.

The operation of this discriminator, as well as of the receiver as a whole, can be more clearly understood by reference to FIGS. 6A, 6B, 6C, and 6D which show the voltages at various points in the receiver circuit. FIG. 6A shows the rectangular signal waves applied to the zero crossover detector. FIG. 6B shows the reset voltage pulses produced by the crossover detector when the rectangular signal waves pass from negative to positive polarity. These reset pulses, when applied to the discriminator, permit the discharge of the capacitor-held voltage applied to the amplifier input terminals. In particular, as can be seen from FIG. 5, they permit the discharge of capacitor $C_1$ by closing switch $S_3$ to connect resistor $R_6$ in parallel with resistor $R_5$ and by closing switch $S_1$ to connect resistor $R_3$ in parallel with the charged capacitor. FIG. 6C shows the voltage applied to the positive terminal of the amplifier. When the input signal is at the same frequency as the high frequency signal, the voltage reaches the bias voltage just as a reset pulse closes switches $S_1$ and $S_3$. Thus, a relatively brief output pulse is triggered. However, when the input signal is at the lower frequency, the voltage builds up to the bias voltage and triggers an output pulse prior to the next reset pulse. This output pulse closes switches $S_2$ and $S_3$, introducing $R_2$ in parallel with the capacitor. By choosing $R_2$ such that $R_2/(R_1 + R_2) = R_5/(R_4 + R_5)$, capacitor $C_1$ can be prevented from discharging to a voltage level sufficiently low to turn off the operational amplifier. Therefore, the amplifier output pulse continues until a reset pulse closes switch $S_1$. Thus, as is shown in FIG. 6D, the discriminator output pulses are of two types, and the duration of these pulses provides a measure of the duration of the wave cycle. These differences in duration can be easily changed into differences in amplitude by a suitable detector.

This receiver can be used either in conjunction with the above described transmitter or with other kinds of FSK transmitters. As previously mentioned, one significant advantage of this receiver is that the output signal is substantially independent of variations in the amplitude of the signal received.

It is understood that the above described arrangements are merely illustrative of the many possible specific embodiments which can represent applications of the principles of the invention. Thus, numerous and varied other arrangements can be readily devised by those skilled in the art without departing from the spirit and scope of the invention.

I claim:

1. In a frequency shift keyed data transmitter of the type comprising an oscillator including an associated RC circuit for producing a series of output pulses whose repetition rate is governed by the time constant of said associated RC circuit; a key switch electrically coupled to said associated RC circuit for altering the time constant of said RC circuit; and a conversion circuit electrically coupled to the output of said oscillator for producing from said pulses sinusoidal output waves having a frequency proportional to the pulse repetition rate, the improvement wherein said oscillator including an associated RC circuit comprises:

operational amplifier means having input and output terminals for producing an output voltage in response to an input voltage exceeding a predetermined level;

means for applying to the input terminals of said operational amplifier a voltage for biasing said input below said predetermined level by a predetermined biasing voltage;

voltage supply means having supply terminals for providing a voltage exceeding said predetermined biasing voltage;

RC circuit means coupled between the supply terminals of said voltage supply means, said RC circuit means including capacitive means electrically coupled to the input of said amplifier so as to apply to said input a voltage exceeding said biasing voltage as said capacitive means becomes charged by said voltage supply and said RC circuit means also including switchably alterable resistive means responsive to said key switch and coupled in series with said capacitive means between the terminals of said voltage supply means for permitting alteration of the resistance in series with said capacitive means, thereby permitting alteration of the rate at which said capacitive means becomes charged; and switchable circuit means coupled to the output of said amplifier, said switchable circuit means including resistive means coupled to said capacitive means by switching means responsive to the output of said amplifier for permitting said capacitive means to discharge to a voltage less than said biasing voltage in response to an output voltage from said amplifier, thereby terminating said (voltage) output voltage.

2. A frequency shift keyed transmitter according to claim 1 wherein the means for biasing the input of said operational amplifier comprises a pair of resistive means connected in series between the supply terminals of said voltage supply means and one of which resistive means is electrically coupled to the input of said amplifier so as to apply to said input a bias voltage which is less than the voltage of said voltage supply means.

3. A frequency shift keyed transmitter according to claim 1 wherein said switchable circuit means coupled to the output of said amplifier for permitting said capacitive means to discharge to a voltage less than said biasing voltage comprises resistive means and normally open switching means electrically coupled to the output of said amplifier for coupling said resistive means in parallel with said capacitive means in response to an output voltage from said amplifier.

4. In a receiver for transmitted frequency shift keyed data of the type comprising an input filter for rejecting frequencies other than the desired signal frequencies, an amplifier electrically coupled to said input filter for augmenting the received sinusoidal signal waves; a signal shaper electrically coupled to the augmenting amplifier for converting the amplified sinusoidal wave into rectangular waves; a zero crossover detector electrically coupled to said signal shaper for producing a reset voltage pulse each time a rectangular wave switches from a first given polarity to a second polarity; a discriminator coupled to said zero crossover detector for producing output pulses whose width is a function of the time between successive reset pulses; and a detector electrically coupled to said discriminator for converting changes in the width of discriminator pulses to changes in amplitude; the improvement wherein said discriminator comprises:

operational amplifier means having input and output terminals for producing an output voltage in response to an input voltage exceeding a predetermined level;

means for applying to the input terminals of said operational amplifier a voltage for biasing said input below said predetermined level by a predetermined biasing voltage;

voltage supply means having supply terminals for providing a voltage exceeding said predetermined biasing voltage;

RC circuit means including serially connected capacitive means and resistive means electrically coupled between the supply terminals of said voltage supply means, said capacitive means being electrically coupled to the input of said amplifier so as to apply to said input a voltage exceeding said predetermined biasing voltage as said capacitive means becomes charged by said voltage supply and the resistance and capacitance of said resistive and capacitive means, respectively, being chosen so that said capacitive means becomes charged at a rate corresponding to the repetition rate of reset pulses produced by the highest frequency of said desired signal frequencies; and switchable circuit means coupled to the outputs of said zero crossover detector and said operational amplifier, said switchable circuit means including resistive means coupled to said capacitive means by switching means responsive the outputs of said zero crossover detector and said operational amplifier for permitting said capacitive means to discharge to a voltage sufficiently low to terminate an output voltage from said amplifier when a reset pulse occurs while said amplifier is producing an output voltage.

5. A receiver according to claim 4 wherein the means for biasing the input of said operational amplifier comprises a pair of resistive means connected in series between the supply terminals of said voltage supply means and one of which resistive means is electrically coupled to the input of said amplifier so as to apply to said input a bias voltage which is less than the voltage of said voltage supply means.

* * * * *